April 19, 1949.  R. M. CRITCHFIELD ET AL  2,467,968
GENERATOR CONTROL SYSTEM
Filed Aug. 22, 1946
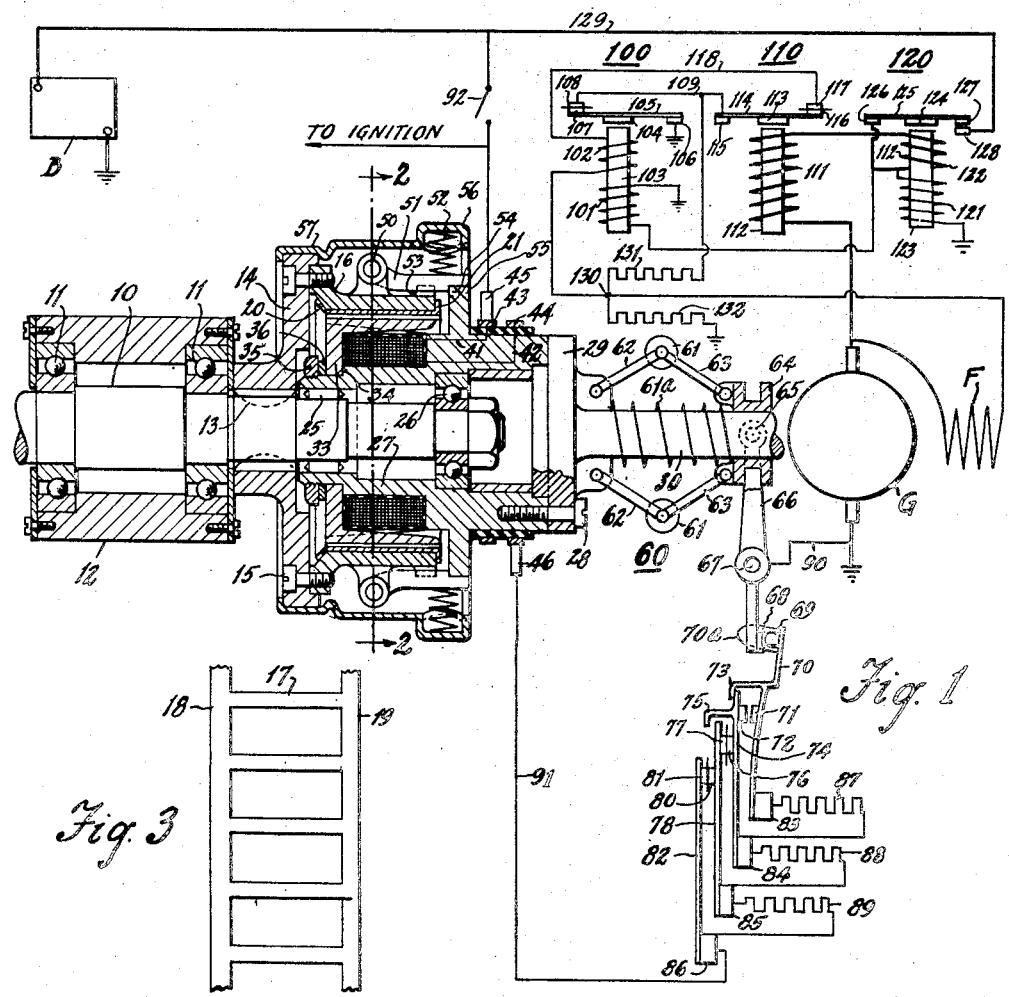
Fig. 1
Fig. 3
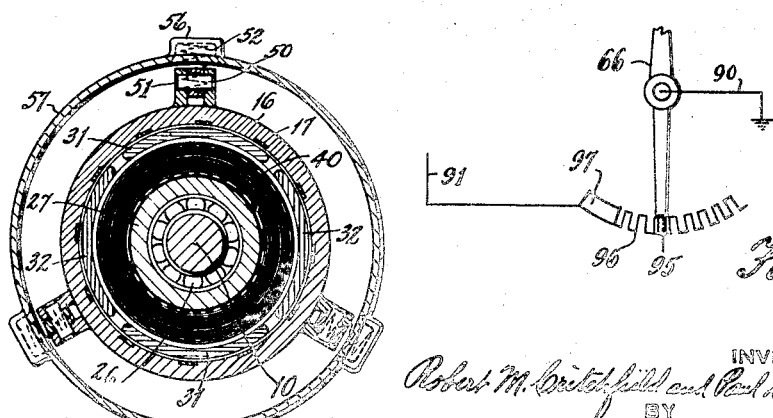
Fig. 2
Fig. 4
INVENTORS
Robert M. Critchfield and Paul L. Schneider
BY
their ATTORNEYS Patented Apr. 19, 1949

2,467,968

UNITED STATES PATENT OFFICE 2,467,968

GENERATOR CONTROL SYSTEM

Robert M. Critchfield and Paul L. Schneider, Anderson, Ind., assignors to General Motors Corporation, Detroit, Mich., a corporation of Delaware Application August 22, 1946, Serial No. 692,351

3 Claims. (Cl. 322—30)

1

This invention relates to control means for a variable ratio drive to be used with automotive generators.

The power required to operate an automotive generator varies with speed and with electrical output, the latter depending on the electrical load operating in the vehicle and the state of charge of the battery. When considering the application of an electromagnetic or electro-hysteresis coupling to the generator drive so that the required drive ratio can be obtained at low engine speeds to secure adequate generator output and so that less drive ratio will be obtained at higher engine or car speeds in order to reduce stress on rotating parts and to reduce wear, particularly that of brushes and commutators, some means for controlling the slip of the coupling is necessary.

An object of the invention is to provide for the control of the slip of an electrical coupling in such manner that the required generator output will be obtained at lower engine speeds while, in the higher speed range of the engine, the generator speed will not be excessive.

In the disclosed embodiment of the invention a speed actuated governor or other speed responsive means controls the energization of the electromagnetic or electro-hysteresis coupling. The generator output may be controlled by voltage and current regulators. A governor driven by the generator causes resistance to be added in the circuit of the exciting coil of the coupling when the speed of the generator tends to become excessive. As resistance is added, the slip of the coupling increases thereby reducing the range of speed through which the generator is caused to operate by the engine whose speed range is much greater. The governor permits operation of the generator at a speed such that generator output will be slightly above the value for which the current regulator is set.

Further objects and advantages of the present invention will be apparent from the following description, reference being had to the accompanying drawing, wherein a preferred embodiment of the present invention is clearly shown.

In the drawing:

Fig. 1 includes a wiring diagram of the generator control system and a longitudinal sectional view of a suitable electrical coupling.

2

Fig. 2 is a sectional view on line 2—2 of Fig. 1.

Fig. 3 is a view of a punched sheet metal part used in the construction of the coupling.

Fig. 4 is a fragmentary wiring diagram showing a modified form of resistance control for use in the system shown in Fig. 1.

The electrical coupling will first be described with reference to Figs. 1, 2 and 3. An engine driven shaft 10 is journaled in bearings 11 supported by a bracket 12. A key 13 connects shaft 10 with a plate 14 connected by screws 15 with a magnetizable rotor 16 provided internally with longitudinal slots, each of which receives a copper bar 17. The bars 17 are all integral with side strips 18 and 19 which, when the bars are assembled with the rotor 16 as shown in Fig. 2, the side strips provide rings 20 and 21 respectively. Thus, the rotor 16 and the copper bars 17 joined to the rings 20 and 21 provide a rotor of the squirrel cage type.

Shaft 10 supports roller bearings 25 and ball bearings 26 supporting a rotating field including a magnetizable tubular shaft 27 to which screws 28 attach a plate 29 integral with shaft 30 which drives generator G. As shown best in Fig. 2, the tubular shaft 27 provides diametrically opposite pole pieces 31 each spanning, circumferentially, slightly less than 90°. Between pole pieces 31 are located pole pieces 32 (similar to 31) provided by a magnetizable plate 33 fitting against a shoulder 34 provided by shaft 27 and maintained in that position by a nut 35 threadedly engaging shaft 27 there being a spacer washer 36 between the nut and the plate. The shaft 27 and its pole pieces 31 and the plate 33 with its pole pieces 32 embrace a field coil 40 whose leads 41 and 42 are connected with slip rings 43 and 44 engaged respectively by brushes 45 and 46. When the coil 40 is excited or energized, magnetism is created having a magnetic flux path which includes the shaft 27, plate 33, the pole pieces 31 and 32 and the rotor 16. As the rotor 16 rotates relative to the pole pieces, eddy currents are generated in the bars 17 and thereby creating a number of small magnetic circuits which try to couple themselves with the magnetism produced by the coil 40. The less the excitation of the coil 40, the less will be the magnetic linkage and the greater will be the slippage between the rotor 16 and the rotating field supported by shaft 27.

Below a certain speed of shaft 10, the shaft 10 and the shaft 30 are directly connected independently of the electrical coupling. For this purpose, the rotor 16 supports pins 50 each pivotally supporting a weighted lever 51. A spring 52 urges each lever 51 toward the shaft and thus into a notch 53 provided by the rotor 16 and into a notch 54 provided by a flange 55 extending from the shaft 27. The outer end of each spring is retained by a cup 56 integral with a shroud 57 supported by the plate 14. The inter-engaging parts 16, 51 and 55 provide a centrifugal clutch for connecting the engine with the generator. The springs 52 may be such as to maintain the clutch in engagement up to, for example, 4000 R. P. M. of the shaft 10. When that speed is reached the weighted levers 51 fly out and disengage the shaft 30 from shaft 10. Above that speed, the generator speed is controlled by the magnetic coupling. When the coupling is fully excited, it allows a certain slip, for example, 1000 R. P. M., which is required in order to obtain the torque required for driving the generator in order that it will continue to produce the required output after the mechanical coupling is disengaged, although generator speed then falls to 3000 R. P. M., for example.

In order that the generator speed will not increase substantially beyond that required to produce the required output, a governor 60 is provided for regulating the current in the exciting coil 40 of the coupling. The governor 60 comprises weights 61 attached by links 62 to plate 29 and by links 63 to a grooved collar 64. As speed increases weights 61 move outwardly by centrifugal force which is opposed by a spring 61a opposing left movement of collar 64 whose groove receives pins 65 carried by the forks of a lever 66 pivoted at 67 and carrying a contact 68 for engaging contact 69 of a spring blade 70 carrying a contact 71 for engaging a contact 72 carried by a spring blade 74 carrying a contact 76 for engaging a contact 77 carried by a spring blade 78 carrying a contact 80 for engaging a contact 81 carried by a blade 82. The blades 70, 74, 78 and 82 are attached respectively to supports 83, 84 and 85 and 86. Resistance 87 bridges supports 83 and 84, resistance 88 bridges supports 84 and 85 and resistance 89 bridges supports 85 and 86. Lever 66 is connected by wire 90 with ground. Support 86 is connected by wire 91 with brush 46. Brush 45 is connected by ignition switch 92 with the battery charging line to be described.

While the coupling members are mechanically connected up to 4000 R. P. M., for example, coupling field excitation is not required. At 4000 R. P. M., when the coupling is mechanically disconnected, full coupling excitation is required. Therefore the coupling coil circuit should be completed before shaft 10 attains 4000 R. P. M. and should remain completed just after the coupling is mechanically disconnected when the generator speed drops to 3000 R. P. M. Consequently, the coupling coil circuit should be completed at least at a speed of 3000 R. P. M. of shaft 10 before the coupling is mechanically disconnected. At about 2800 R. P. M., the contact 68 engages a side contact 70a provided by blade 70. Therefore the circuit of coil 40 is completed although contacts 68 and 69 may be separated. As the speed of shaft 30 increases from 2800 up to 4000 R. P. M., while the coupling is mechanically connected, the lever 66 moves counterclockwise successively to interrupt the short circuits of the resistances 87, 88 and 89. Just before the coupling is mechanically disconnected, all three resistances are effective to reduced coupling coil excitation. Immediately following the mechanical disconnection of the coupling at 4000 R. P. M. of shaft 10, the spring 61a restores the lever to a position such that all resistances are short circuited and contact 68 is close to or touching contact 69. The speed of shaft 30 is then 3000 R. P. M. As engine speed increases and the speed of shaft 30 tends to increase, notwithstanding the slippage of the coupling when fully excited, lever 66 moves counterclockwise to cause blade 70 to move into a position such as shown in Fig. 1 to separate contacts 71 from 72 thereby interrupting the short circuit around resistance 87 and reducing the excitation of coupling coil 40 so that the slippage will be greater. If engine speed is such that generator speed still tends to increase, the lever 66 will move still further to cause blade 70 to bend further to the right and causes hook 73 to engage the blade 74 and bend it also to the right to separate contact 76 from contact 77 thereby interrupting the short circuit of the resistance 88 further to decrease the excitation of the coupling coil 40. If engine speed increases to the maximum and the generator speed still tends to increase the movement of lever 66 still further counterclockwise, thereby causing hook 75 of blade 74 to engage lever 78 to separate contact 80 from contact 81 whereupon the short circuit of resistance 89 is broken. The resistances 87, 88 and 89 are effective to limit the excitation of coil 40. In this manner, the speed of the generator is maintained within reasonable limits between 3000 and 4000 R. P. M. for example. Instead of using a stepped resistance for controlling the excitation of coil 40, the lever 66 can be provided with a wiper 95 for engaging a rheostat 96. A wide contact 97 engaged by the wiper 95 serves the purpose of contact 70a in Fig. 1.

The regulation of current in the field winding F of the generator G is controlled by the voltage regulator 100 and current regulator 110. The connection between the generator G and the storage battery B is effected by reverse current or cutout relay 120.

Voltage regulator 100 comprises a generator voltage responsive winding 101 and a field current responsive winding 102 which surround a core 103 cooperating with an armature 104 carried by a blade 105 fixed to a grounded support 106 and carrying a contact 107 for engaging a contact 108 connected with a wire 109.

Current regulator comprises a generator output current responsive coil 111 surrounding the core 112 cooperating with an armature 113 carried by a spring blade 114 attached to a support 115 and carrying a contact 116 engaging a contact 117 connected by a wire 118 with coil 102 of the voltage regulator.

The reverse current relay comprises a grounded voltage responsive winding 121 and a current responsive winding 122, the latter being in the battery charging circuit. Windings 121 and 122 surrounding a core 123 cooperating with an armature 124 carried by a spring blade 125 attached to a support 126 and carrying a contact 127 for engagement with the contact 128 connected with the battery B and with the ignition switch 92 by a wire 129. At a predetermined generator voltage the excitation of the coil 121 is sufficient to effect the movement of armature 124 toward the core 123 to effect the completion of the battery charging circuit by the engagement of contact 127 and contact 128. Thereafter, generator voltage may fall below that value but the contacts will remain in engagement due to the magnetizing effect of the coil 122. Therefore, so long as the generator voltage exceeds the battery voltage, the contacts 127 and 128 will remain in engagement. However, when generator speed falls so low that the battery begins to discharge through the generator, the current in winding 122 is reversed and the contact 127 separates from the contact 128.

Field winding F is connected with a terminal 130 connected with coil 102 connected with resistance 131 which is connected with wire 109 and connected with resistance 132 which is grounded. Before the regulators 100 and 110 begin to function, the field winding F is connected to ground through the contacts of the current regulator and the contacts of the voltage regulator. When the voltage of the generator attains the value for which the voltage regulator is set, the contact 107 separates from the contact 108 thereby rendering resistance 132 operative to limit the field current. When the current output of the generator exceeds that for which the current regulator is set, contact 116 separates from contact 117 and resistances 131 and 132 are both effective to limit the field current. During the lower speed range of the engine, while the coupling parts are mechanically connected, the generator speed is high relative to engine speed and the cutout relay closes at a relatively low engine speed to connect the generator with the battery. As engine speed increases, the regulators become effective to limit the voltage and output of the generator. When engine speed attains a medium value, the coupling members are mechanically disconnected and thereafter as engine speed increases, coupling slip is controlled in a manner such that generator speed will not become excessive but the speed will be sufficient to provide generator voltage and current output for which the regulators are set.

In some installations, it may not be necessary to use the speed responsive mechanical connection between the coupling members. If the levers 51 are omitted, the maximum excitation of the coupling coil 50 would remain in effect until the generator speed begins to exceed that required for the voltage current output for which the regulators are set. This effect can be obtained by using a spring 61a of suitable calibration and by the proper initial separation of the contacts 68 from the contacts 69 so that contact 71 does not separate from contact 72 until the generator speed begins to rise above that which is required for the desired voltage and current output. The contact 70a of Fig. 1 and the contact 97 of Fig. 4 should have such length that, at zero speed, they would be engaged by contact 68 and wiper 95, respectively.

When the voltage regulator starts operating, the generator tends to run faster because its output and torque requirements are limited by the voltage regulator. As the generator speed tends to exceed that for which the governor is set to operate, the excitation of coil 40 of the rotating field of the coupling is reduced by the governor 60 so that the required generator speed is maintained.

While the embodiment of the present invention as herein disclosed, constitutes a preferred form, it is to be understood that other forms might be adapted, all coming within the scope of the claims which follow.

What is claimed is as follows:

1. A generator control system for use on automotive vehicles in which the propelling engine drives a generator comprising, in combination, a transmission between the engine and the generator including an electromagnetic coupling having an exciting coil and providing slip varying with the current in the coil, means for mechanically connecting the engine and generator independently of the electromagnetic coupling and operating in response to the attainment of a certain engine speed to disconnect mechanically the generator and engine leaving the coupling effective to transmit torque from the engine to the generator, said coupling when fully excited providing a certain slip whereby, when the mechanical connection is interrupted, generator speed decreases to a value less than when driven by the engine through the mechanical connection just before interruption thereof, and means which operates to permit full excitation of the coupling at the speed value to which the generator speed falls when the mechanical connection is interrupted and operating thereafter to reduce the excitation of the coupling coil as generator speed tends to increase above the speed last mentioned.

2. In a generator control system for use on an automotive vehicle having a propelling engine to drive a generator, a transmission mechanism operable to provide a drive between the engine and the generator, said mechanism including an electromagnetic coupling having an exciting coil and providing a slip varying with the current in the coil; centrifugal means for mechanically connecting the engine and the generator independently of the electromagnetic coupling and operating in response to the attainment of a certain engine speed to disconnect mechanically the generator and engine leaving the coupling effective to transmit torque from the engine to the generator; a circuit between the field of the generator and the coil for regulating the current in the exciting coil; a resistance in the circuit; speed responsive means rotatable with the shaft of the generator for controlling the resistance, said means increasing the resistance up to the time the coupling is mechanically connected to limit the excitation of the coil so that when the mechanical connection is interrupted the generator speed decreases to a value less than when driven by the engine through the mechanical connection, said speed responsive means controlling the resistance after the mechanical interruption according to the speed of the generator.

3. In an apparatus of the class described the combination comprising, a driving member, a driven generator, an electromagnetic coupling between the member and the generator having an exciting coil and providing a slip varying with the current in the coil; an electric circuit between the field of the generator and the coil for controlling the output of the generator; a plurality of resistance units in the circuit; shunts for the resistance units; means for mechanically connecting the driving member and generator independently of the coupling and operating in response to the attainment of a certain speed of the driving member to disconnect mechanically the driving member and the generator leaving the coupling effective to transmit torque from the driving member to the generator; speed responsive means rotatable with the generator and operative to close the circuit to excite the coil of the coupling and adapted gradually to cut in said resistance units by cutting out the shunts with increase of speed of the generator, said coupling when fully excited providing a slip whereby, when the mechanical connection is interrupted, generator speed decreases to a value less than when driven by the driving member through the mechanical connection just before the interruption thereof, said speed responsive means operating, after the mechanical connection is interrupted to shunt out the resistance as the speed of the generator is reduced and vice versa.

ROBERT M. CRITCHFIELD.
PAUL L. SCHNEIDER.

REFERENCES CITED

The following references are of record in the file of this patent:

UNITED STATES PATENTS

| Number | Name | Date |
| --- | --- | --- |
| 704,574 | Pintsch | July 15, 1902 |
| 1,855,333 | Borovec et al. | Apr. 26, 1932 |

FOREIGN PATENTS

| Number | Country | Date |
| --- | --- | --- |
| 466,978 | France | Mar. 20, 1914 |